US012067845B2

(12) United States Patent
Hallerbach et al.

(10) Patent No.: US 12,067,845 B2
(45) **Date of Patent: *Aug. 20, 2024**

(54) GAMING SYSTEM AND METHOD FOR PROVIDING A PLURALITY OF CHANCES OF WINNING A PROGRESSIVE AWARD WITH DYNAMICALLY SCALABLE PROGRESSIVE AWARD ODDS

(71) Applicant: IGT, Las Vegas, NV (US)

(72) Inventors: Boris Hallerbach, Reno, NV (US); Jeffrey Urmston, Reno, NV (US)

(73) Assignee: IGT, Las Vegas, NV (US)

( * ) Notice: Subject to any disclaimer, the term of this patent is extended or adjusted under 35 U.S.C. 154(b) by 173 days.

This patent is subject to a terminal disclaimer.

(21) Appl. No.: 17/313,645

(22) Filed: May 6, 2021

(65) Prior Publication Data

US 2021/0272419 A1 Sep. 2, 2021

Related U.S. Application Data

(63) Continuation of application No. 16/439,155, filed on Jun. 12, 2019, now Pat. No. 11,011,024, which is a continuation of application No. 15/271,666, filed on Sep. 21, 2016, now Pat. No. 10,325,450.

(51) Int. Cl.
*G07F 17/32* (2006.01)

(52) U.S. Cl.
CPC ...... *G07F 17/3262* (2013.01); *G07F 17/3209* (2013.01); *G07F 17/3211* (2013.01); *G07F 17/3258* (2013.01); *G07F 17/3267* (2013.01)

(58) Field of Classification Search
CPC ............. G07F 17/3258; G07F 17/3293; G07F 17/3209; G07F 17/3211; G07F 17/3267; G07F 17/3262
See application file for complete search history.

(56) References Cited

U.S. PATENT DOCUMENTS

| | | | |
|---|---|---|---|
| 4,837,728 | A | 6/1989 | Barrie et al. |
| 4,861,041 | A | 8/1989 | Jones et al. |
| 5,116,055 | A | 5/1992 | Tracy |
| 5,249,800 | A | 10/1993 | Hilgendorf et al. |
| 5,280,909 | A | 1/1994 | Tracey |
| 5,344,144 | A | 9/1994 | Canon |
| 5,364,104 | A | 11/1994 | Jones et al. |
| 5,377,973 | A | 1/1995 | Jones et al. |
| 5,417,430 | A | 5/1995 | Breeding |
| 5,564,700 | A | 10/1996 | Celona |
| 5,580,309 | A | 12/1996 | Piechowiak et al. |
| 5,611,730 | A | 3/1997 | Weiss |
| 5,645,486 | A | 7/1997 | Nagao et al. |
| 5,647,592 | A | 7/1997 | Gerow |

(Continued)

FOREIGN PATENT DOCUMENTS

| | | |
|---|---|---|
| WO | 99/03078 | 1/1999 |
| WO | 01/33478 | 5/2001 |

(Continued)

*Primary Examiner* — Malina D. Blaise

(74) *Attorney, Agent, or Firm* — Neal, Gerber & Eisenberg LLP

(57) ABSTRACT

The gaming system disclosed herein provides a plurality of chances to win a progressive award with the odds of winning the progressive award in at least one chance being based on the wager amount placed.

10 Claims, 6 Drawing Sheets

(56) References Cited

U.S. PATENT DOCUMENTS 5,655,961 A 8/1997 Acres et al.
5,702,304 A 12/1997 Acres et al.
5,741,183 A 4/1998 Acres et al.
5,766,076 A 6/1998 Pease et al.
5,820,459 A 10/1998 Acres et al.
5,851,147 A 12/1998 Stupak et al.
5,876,284 A 3/1999 Acres et al.
5,885,158 A 3/1999 Torango et al.
5,911,626 A 6/1999 McCrea, Jr.
5,941,773 A 8/1999 Harlick
5,944,606 A 8/1999 Gerow
5,951,011 A 9/1999 Potter et al.
6,012,982 A 1/2000 Piechowiak et al.
6,032,955 A 3/2000 Luciano et al.
6,089,980 A 7/2000 Gauselmann
6,102,402 A 8/2000 Scott et al.
6,102,799 A 8/2000 Stupak
6,110,043 A 8/2000 Olsen
6,146,273 A 11/2000 Olsen
6,162,122 A 12/2000 Acres et al.
6,203,010 B1 3/2001 Jorasch et al.
6,210,275 B1 4/2001 Olsen
6,217,448 B1 4/2001 Olsen
6,224,482 B1 5/2001 Bennett
6,224,484 B1 5/2001 Okuda et al.
6,231,445 B1 5/2001 Acres
6,241,608 B1 6/2001 Torango
6,254,483 B1 7/2001 Acres
6,257,981 B1 7/2001 Acres et al.
6,266,103 B1 7/2001 Barton et al.
6,312,333 B1 11/2001 Acres
6,336,862 B1 1/2002 Byrne
6,358,149 B1 3/2002 Schneider et al.
6,364,314 B1 4/2002 Canterbury
6,364,768 B1 4/2002 Acres et al.
6,371,852 B1 4/2002 Acres
6,375,567 B1 4/2002 Acres
6,375,569 B2 4/2002 Acres
6,394,902 B1 5/2002 Glavich
6,416,409 B1 7/2002 Jordan
6,431,983 B2 8/2002 Acres
6,435,511 B1 8/2002 Vancura et al.
6,435,968 B1 8/2002 Torango
RE37,885 E 10/2002 Acres et al.
6,565,434 B1 5/2003 Acres
6,575,832 B1 6/2003 Manfredi et al.
6,589,115 B2 7/2003 Walker et al.
6,592,458 B1 7/2003 Ho
6,599,188 B2 7/2003 Hirsch et al.
6,599,193 B2 7/2003 Baerlocher et al.
6,604,997 B2 8/2003 Saidakovsky et al.
6,607,441 B1 8/2003 Acres
6,629,177 B1 9/2003 Chong
6,656,052 B2 12/2003 Abramopoulos et al.
6,676,513 B2 1/2004 Gauselmann
6,712,695 B2 3/2004 Mothwurf et al.
6,712,697 B2 3/2004 Acres
6,776,715 B2 8/2004 Price
6,800,030 B2 10/2004 Acres
6,802,773 B2 10/2004 Moody
6,832,958 B2 12/2004 Acres et al.
6,835,134 B2 12/2004 Poole et al.
6,878,063 B2 4/2005 Manfredi et al.
6,887,154 B1 5/2005 Luciano, Jr. et al.
6,910,964 B2 6/2005 Acres
6,939,230 B2 * 9/2005 Vancura .............. G07F 17/3227
463/25
RE38,812 E 10/2005 Acres et al.
7,004,466 B2 2/2006 Gauselmann
7,029,395 B1 4/2006 Baerlocher
7,037,195 B2 5/2006 Schneider et al.
7,048,628 B2 5/2006 Schneider
7,056,215 B1 6/2006 Olive
7,070,505 B2 7/2006 Vancura et al.
7,297,059 B2 11/2007 Vancura et al.
7,357,716 B2 4/2008 Marks et al.
7,374,486 B2 5/2008 Baerlocher
7,384,337 B2 6/2008 Thomas
7,470,184 B2 12/2008 Baerlocher et al.
7,533,886 B2 5/2009 Kenny et al.
7,611,404 B1 11/2009 Hilf et al.
7,651,392 B2 1/2010 Pennington et al.
7,662,040 B2 2/2010 Englman et al.
7,666,093 B2 2/2010 Lafky et al.
7,713,120 B2 5/2010 Cannon
7,753,784 B2 7/2010 Baerlocher
7,780,520 B2 8/2010 Baerlocher
7,780,531 B2 8/2010 Englman et al.
7,874,915 B2 1/2011 Caspers et al.
7,905,778 B2 3/2011 Breckner
7,914,377 B2 3/2011 Benbrahim
7,931,530 B2 4/2011 Anderson et al.
7,942,737 B2 5/2011 Cregan et al.
7,976,383 B2 7/2011 Fujimoto et al.
8,033,903 B2 10/2011 Cregan
8,070,597 B2 12/2011 Cuddy
8,074,992 B1 12/2011 Friedman
8,092,302 B2 1/2012 Cuddy et al.
8,096,874 B2 1/2012 Nicely et al.
8,113,939 B2 2/2012 Cannon
8,128,491 B2 3/2012 Vasquez et al.
8,137,180 B2 3/2012 Thomas
8,142,278 B2 3/2012 Tsukahara
8,157,646 B2 4/2012 Pawloski et al.
8,167,711 B2 5/2012 Baerlocher
8,182,338 B2 5/2012 Thomas
8,197,337 B2 6/2012 DeWaal et al.
8,210,937 B2 7/2012 Cregan et al.
8,231,453 B2 7/2012 Wolf et al.
8,251,805 B2 8/2012 Englman et al.
8,282,462 B2 10/2012 Fujimoto et al.
8,328,631 B2 12/2012 Baerlocher
8,337,298 B2 12/2012 Baerlocher
8,353,761 B2 1/2013 Kelly et al.
8,388,439 B2 3/2013 Kato
8,398,478 B2 3/2013 Okada
8,408,994 B2 4/2013 Baerlocher et al.
8,435,111 B2 5/2013 Filipour et al.
8,449,381 B2 5/2013 Fujimoto et al.
8,449,387 B2 5/2013 Englman et al.
8,454,434 B1 6/2013 Schaefer
8,469,786 B2 6/2013 Suttle
8,480,485 B2 7/2013 Englman et al.
8,485,888 B2 7/2013 Baerlocher
8,500,548 B2 8/2013 Baerlocher et al.
8,500,549 B2 8/2013 Fujimoto et al.
8,591,313 B2 11/2013 Gomez
8,628,400 B2 * 1/2014 Aoki ................... G07F 17/3267
463/20
8,721,417 B2 5/2014 Halverson
8,845,417 B1 9/2014 Englman et al.
8,974,279 B1 3/2015 Nowak et al.
9,092,941 B2 * 7/2015 Baerlocher ............. G07F 17/34
9,626,833 B2 * 4/2017 Cuddy ................ G07F 17/3258
2001/0036857 A1 11/2001 Mothwurf et al.
2002/0042299 A1 4/2002 Soltys et al.
2002/0160825 A1 10/2002 Nicastro et al.
2002/0169015 A1 11/2002 Moody
2003/0027625 A1 2/2003 Rowe
2003/0036425 A1 2/2003 Kaminkow et al.
2003/0054877 A1 3/2003 Baerlocher
2003/0119586 A1 6/2003 Crumby
2003/0181231 A1 9/2003 Vancura et al.
2003/0209853 A1 11/2003 Harris
2003/0211884 A1 11/2003 Gauselmann
2003/0222402 A1 12/2003 Olive
2003/0228899 A1 12/2003 Evans
2003/0236116 A1 12/2003 Marks et al.
2004/0009808 A1 1/2004 Gauselmann
2004/0023716 A1 2/2004 Gauselmann
2004/0038741 A1 2/2004 Gauselmann
2004/0048644 A1 3/2004 Gerrard et al.
2004/0092304 A1 5/2004 George et al.
2004/0102238 A1 5/2004 Taylor

(56) References Cited

U.S. PATENT DOCUMENTS

| | | | | |
|---|---|---|---|---|
| 2004/0166918 | A1 | 8/2004 | Walker et al. | |
| 2004/0242320 | A1 | 12/2004 | Jackson | |
| 2005/0003880 | A1 | 1/2005 | Englman et al. | |
| 2005/0003886 | A1 | 1/2005 | Englman et al. | |
| 2005/0037837 | A1 | 2/2005 | Rowe | |
| 2005/0054429 | A1 | 3/2005 | Baerlocher et al. | |
| 2005/0054434 | A1 | 3/2005 | Baerlocher et al. | |
| 2005/0055113 | A1 | 3/2005 | Gauselmann | |
| 2005/0059467 | A1 | 3/2005 | Saffari et al. | |
| 2005/0059472 | A1 | 3/2005 | Joshi et al. | |
| 2005/0059481 | A1 | 3/2005 | Joshi et al. | |
| 2005/0064930 | A1 | 3/2005 | Jubinville et al. | |
| 2005/0096130 | A1 | 5/2005 | Mullins | |
| 2005/0137010 | A1 | 6/2005 | Enzminger et al. | |
| 2005/0176494 | A1 | 8/2005 | Thomas | |
| 2005/0192088 | A1 | 9/2005 | Hartman et al. | |
| 2005/0215311 | A1* | 9/2005 | Hornik | G07F 17/3267 463/20 |
| 2005/0215313 | A1 | 9/2005 | O'Halloran | |
| 2005/0215314 | A1 | 9/2005 | Schneider et al. | |
| 2005/0288081 | A1 | 12/2005 | Amaitis et al. | |
| 2006/0003829 | A1 | 1/2006 | Thomas | |
| 2006/0009283 | A1 | 1/2006 | Englman et al. | |
| 2006/0019737 | A1 | 1/2006 | Yang | |
| 2006/0025195 | A1 | 2/2006 | Pennington et al. | |
| 2006/0025210 | A1 | 2/2006 | Johnson | |
| 2006/0030399 | A1 | 2/2006 | Baerlocher | |
| 2006/0030403 | A1 | 2/2006 | Lafky et al. | |
| 2006/0052159 | A1 | 3/2006 | Cahill et al. | |
| 2006/0073887 | A1 | 4/2006 | Nguyen et al. | |
| 2006/0073889 | A1 | 4/2006 | Edidin et al. | |
| 2006/0073897 | A1 | 4/2006 | Englman et al. | |
| 2006/0100019 | A1 | 5/2006 | Homik et al. | |
| 2006/0116201 | A1 | 6/2006 | Gauselmann | |
| 2006/0131809 | A1 | 6/2006 | Lancaster | |
| 2006/0135243 | A1 | 6/2006 | Englman et al. | |
| 2006/0142079 | A1 | 6/2006 | Ikehara et al. | |
| 2006/0142086 | A1 | 6/2006 | Blackburn et al. | |
| 2006/0154718 | A1 | 7/2006 | Willyard et al. | |
| 2006/0178203 | A1 | 8/2006 | Hughes et al. | |
| 2006/0183535 | A1 | 8/2006 | Marks et al. | |
| 2006/0183537 | A1 | 8/2006 | Dickerson | |
| 2006/0183538 | A1 | 8/2006 | Michaelson et al. | |
| 2006/0281527 | A1 | 12/2006 | Dunaevsky et al. | |
| 2006/0287043 | A1 | 12/2006 | Englman et al. | |
| 2006/0287077 | A1 | 12/2006 | Grav et al. | |
| 2007/0026941 | A1 | 2/2007 | Block et al. | |
| 2007/0054733 | A1 | 3/2007 | Baerlocher | |
| 2007/0060244 | A1 | 3/2007 | Yaldoo et al. | |
| 2007/0060271 | A1 | 3/2007 | Cregan et al. | |
| 2007/0060292 | A1* | 3/2007 | Peterson | G07F 17/3244 463/20 |
| 2007/0060314 | A1 | 3/2007 | Baerlocher et al. | |
| 2007/0060319 | A1 | 3/2007 | Block et al. | |
| 2007/0060320 | A1 | 3/2007 | Kelly et al. | |
| 2007/0060321 | A1* | 3/2007 | Vasquez | G07F 17/32 463/27 |
| 2007/0060365 | A1 | 3/2007 | Tien et al. | |
| 2007/0075497 | A1 | 4/2007 | Friedman | |
| 2007/0167210 | A1 | 7/2007 | Kelly et al. | |
| 2007/0167226 | A1 | 7/2007 | Kelly et al. | |
| 2007/0259709 | A1 | 11/2007 | Kelly et al. | |
| 2007/0259711 | A1 | 11/2007 | Thomas | |
| 2007/0265065 | A1 | 11/2007 | Seelig | |
| 2008/0015005 | A1 | 1/2008 | Yaldoo et al. | |
| 2008/0015012 | A1 | 1/2008 | Englman et al. | |
| 2008/0039191 | A1* | 2/2008 | Cuddy | G07F 17/32 463/25 |
| 2008/0045341 | A1 | 2/2008 | Englman | |
| 2008/0070679 | A1 | 3/2008 | Seelig et al. | |
| 2008/0076503 | A1 | 3/2008 | Mattice et al. | |
| 2008/0090651 | A1 | 4/2008 | Baerlocher | |
| 2008/0108410 | A1 | 5/2008 | Baerlocher | |
| 2008/0108412 | A1 | 5/2008 | Snow et al. | |
| 2008/0108425 | A1 | 5/2008 | Oberberger | |
| 2008/0108430 | A1 | 5/2008 | Evans | |
| 2008/0108431 | A1 | 5/2008 | Cuddy et al. | |
| 2008/0113770 | A1 | 5/2008 | Gelber et al. | |
| 2008/0125211 | A1* | 5/2008 | Plowman | G07F 17/3244 463/20 |
| 2008/0125216 | A1 | 5/2008 | Okada | |
| 2008/0224402 | A1 | 9/2008 | Snow et al. | |
| 2008/0254873 | A1 | 10/2008 | Fujitmoto et al. | |
| 2008/0254875 | A1 | 10/2008 | Fujimoto et al. | |
| 2008/0254883 | A1 | 10/2008 | Patel et al. | |
| 2008/0254893 | A1 | 10/2008 | Patel et al. | |
| 2008/0261683 | A1 | 10/2008 | Russell et al. | |
| 2008/0305864 | A1 | 12/2008 | Kelly et al. | |
| 2008/0305865 | A1 | 12/2008 | Kelly et al. | |
| 2008/0305866 | A1 | 12/2008 | Kelly et al. | |
| 2009/0042638 | A1 | 2/2009 | Thomas | |
| 2009/0042645 | A1 | 2/2009 | Graham et al. | |
| 2009/0088244 | A1 | 4/2009 | Nicely et al. | |
| 2009/0117968 | A1* | 5/2009 | Krietemeyer | G07F 17/3258 463/18 |
| 2009/0124362 | A1 | 5/2009 | Cuddy et al. | |
| 2009/0124364 | A1 | 5/2009 | Cuddy et al. | |
| 2009/0131149 | A1* | 5/2009 | Jackson | G07F 17/3244 463/20 |
| 2009/0247277 | A1 | 10/2009 | Caspers et al. | |
| 2009/0247292 | A1 | 10/2009 | Caspers et al. | |
| 2010/0016060 | A1 | 1/2010 | Jaffe | |
| 2010/0120498 | A1* | 5/2010 | Cuddy | G07F 17/3255 463/20 |
| 2010/0124970 | A1* | 5/2010 | Pawloski | G07F 17/3244 463/20 |
| 2010/0124973 | A1 | 5/2010 | DeWaal et al. | |
| 2010/0267442 | A1 | 10/2010 | Englman et al. | |
| 2010/0304830 | A1 | 12/2010 | Englman et al. | |
| 2011/0003636 | A1 | 1/2011 | Thomas et al. | |
| 2011/0003637 | A1 | 1/2011 | LeFever | |
| 2011/0053676 | A1 | 3/2011 | Wolf | |
| 2011/0111843 | A1 | 5/2011 | Nicely et al. | |
| 2011/0124402 | A1 | 5/2011 | De Waal et al. | |
| 2011/0165938 | A1 | 7/2011 | Anderson et al. | |
| 2011/0201410 | A1 | 8/2011 | Englman et al. | |
| 2011/0269537 | A1 | 11/2011 | Mattice et al. | |
| 2012/0021816 | A1 | 1/2012 | Aoki | |
| 2012/0046098 | A1 | 2/2012 | Cuddy | |
| 2012/0094738 | A1* | 4/2012 | Aoki | G07F 17/3258 463/20 |
| 2012/0100902 | A1 | 4/2012 | Moshal | |
| 2012/0309481 | A1 | 12/2012 | Davis | |
| 2013/0225277 | A1 | 8/2013 | Hughes | |
| 2013/0231170 | A1 | 9/2013 | Macaulay | |
| 2013/0260868 | A1* | 10/2013 | Caputo | G07F 17/3211 463/25 |
| 2015/0008119 | A1 | 1/2015 | Papapanayiotou et al. | |
| 2015/0080119 | A1* | 3/2015 | Schaefer | G07F 17/3225 463/27 |
| 2015/0206397 | A1* | 7/2015 | Nelson | G07F 17/323 463/42 |
| 2016/0005271 | A1 | 1/2016 | Vasquez et al. | |

FOREIGN PATENT DOCUMENTS

| | | |
|---|---|---|
| WO | 2005/099425 | 10/2005 |
| WO | 2005/099845 | 10/2005 |
| WO | 2005/110563 | 11/2005 |
| WO | 2005/113093 | 12/2005 |
| WO | 2006/014770 | 2/2006 |
| WO | 2006/014990 | 2/2006 |
| WO | 2006/130597 | 12/2006 |
| WO | 2006/130611 | 12/2006 |
| WO | 2007/028108 | 3/2007 |
| WO | 2007/030552 | 3/2007 |
| WO | 2007/030632 | 3/2007 |
| WO | 2007/030733 | 3/2007 |
| WO | 2007/032945 | 3/2007 |
| WO | 2007/117502 | 10/2007 |
| WO | 2007/123858 | 11/2007 |
| WO | 2007/130464 | 11/2007 |
| WO | 2008/005366 | 1/2008 |

(56) References Cited

FOREIGN PATENT DOCUMENTS

| | | |
|---|---|---|
| WO | 2008/021449 | 2/2008 |
| WO | 2008/039403 | 4/2008 |
| WO | 2008/057356 | 5/2008 |
| WO | 2008/060978 | 5/2008 |
| WO | 2008/063297 | 5/2008 |
| WO | 2008/063394 | 5/2008 |

* cited by examiner

1000

GAMING SYSTEM AND METHOD FOR PROVIDING A PLURALITY OF CHANCES OF WINNING A PROGRESSIVE AWARD WITH DYNAMICALLY SCALABLE PROGRESSIVE AWARD ODDS

PRIORITY CLAIM

This application is a continuation of, claims priority to and the benefit of U.S. patent application Ser. No. 16/439,155, filed on Jun. 12, 2019, which is a continuation of, claims priority to and the benefit of U.S. patent application Ser. No. 15/271,666, filed on Sep. 21, 2016, the entire contents of which are each incorporated by reference herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager (e.g., the higher the wager, the higher the award).

Gaming machines which provide secondary or bonus games are also known. The secondary or bonus games usually provide an additional award, such as a bonus award, to the player. Secondary or bonus games usually do not require an additional wager by the player to be activated. Instead, secondary or bonus games are generally activated or triggered upon an occurrence of a designated triggering symbol or triggering symbol combination in the primary or base game. When a secondary or bonus game is triggered, the gaming machine generally indicates this triggering to the player through one or more visual and/or audio output devices, such as the reels, lights, speakers, video screens, etc. Part of the enjoyment and excitement of playing certain gaming machines is the occurrence or triggering of the secondary or bonus game (even before the player knows how much the bonus award will be).

Progressive awards associated with gaming machines are also known. In one form, a progressive award is an award amount which includes an initial amount funded by a casino or primary game paytable and an additional amount funded through a portion of certain wagers made on the progressive gaming machines. Typically, the progressive award grows in value as players play the gaming machines and more portions of these players' wagers are allocated to the progressive award. When a player has placed a wager amount associated with an eligibility to win the progressive award and that player obtains a winning symbol or winning symbol combination associated with the progressive award, the accumulated progressive award is provided to the player. For these gaming machines, when a player has not placed a wager amount associated with an eligibility to win the progressive award, even if that player obtains a winning symbol or winning symbol combination associated with the progressive award, the accumulated progressive award is not provided to the player. For these gaming machines, after the progressive award is provided to the player, the amount of the next progressive award is reset to the initial value and a portion of certain subsequent wagers on a gaming machine associated with a progressive award is allocated to the next progressive award.

A progressive award may be associated with or otherwise dedicated to a single or stand-alone gaming machine. Alternatively, a progressive award may be associated with or otherwise dedicated to multiple gaming machines which each contribute a portion of wagers placed at such gaming machine(s) to the progressive award. The multiple gaming machines may be in the same bank of gaming machines, in the same casino or gaming establishment (usually through a local area network ("LAN")) or in two or more different casinos or gaming establishments (usually through a wide area network ("WAN")). Such progressive awards are played for by one or more gaming machines in the same gaming establishment are sometimes called local area progressives ("LAP") and such progressive awards played for by a plurality of gaming machines at a plurality of different gaming establishments are sometimes called wide area progressives ("WAP"). Moreover, a gaming machine or bank of gaming machines may be simultaneously associated with a plurality of progressive awards. In these multi-level progressive award ("MLP") configurations, a plurality of progressive awards start at different progressive award or value levels, such as $10, $100, $1000 and $10,000 and each individually increment or increase until provided to a player. Upon a suitable triggering event at one of more of the gaming machines associated with the MLP, one or more of the progressive awards which form the MLP are provided to one or more of the players at such gaming machines. Similar to gaming machines which employ secondary games, gaming machines which employ progressive awards provide excitement and enjoyment for players.

While progressive awards are popular amongst players, certain players become discouraged by the frequency which such progressive awards are provided. For example, when a progressive award is not provided relatively frequently, a player may feel deflated that the progressive award will not hit for a long period of time and not wish to continue playing the gaming machine. In another example, after a progressive award is provided to a player, a player may not find the reset progressive award desirable or worth the cost of continuing to play. Such a decision to stop playing the gaming machine or not even start playing the gaming machine due to the above-described situations of jackpot fatigue presents a problem to gaming establishment operators.

Moreover, certain players whom choose to place wager amounts greater than the wager amount associated with an eligibility to win a progressive award realize little to no benefit, as it pertains to a probability of winning the progressive award, in placing such a higher wager amount. That is, due to the need to not change or otherwise modify the probabilities of obtaining certain symbols and/or the probabilities of other game events from occurring, gaming machines do not modify the odds of winning a progressive award as the player places higher and higher wager amounts above the wager amount associated with an eligibility to win a progressive award. Such a configuration provides a disincentive for certain players to place wagers above the wager amount associated with an eligibility to win a progressive award and thus presents a problem to gaming establishment operators.

A continuing need exists to provide progressive awards to players.

SUMMARY

The present disclosure relates generally to gaming systems and methods for providing a plurality of chances to win a progressive award with the odds of winning the progressive award in at least one chance being based on the wager amount placed.

In various embodiments, upon placing a wager which exceeds a first threshold amount, the gaming system disclosed herein provides the player a first opportunity to win a progressive award in association with a first game sequence. If the player does not win the progressive award in association with the first game sequence, if the player's wager exceeds a second, greater threshold amount, the gaming system provides the player an additional chance or opportunity to win the same progressive award in a second game sequence. Such an additional chance may be based on one or more events which occurred either in or in association with the first game sequence. In these embodiments, based on an amount of a wager placed, the gaming system provides the player one or more opportunities to win a progressive award wherein the greater the qualifying wager amount placed, the greater the odds of winning the progressive award. In addition to combating jackpot fatigue by providing players additional chances to win a progressive award, such a improvement to existing gaming systems dynamically scales the odds of a player winning a progressive award without changing or otherwise modifying the probabilities of obtaining certain symbols and/or the probabilities of other game events from occurring. This improvement to known gaming systems by automatically dynamically scaling the odds of a player winning a progressive award for different wager amounts above the wager amount associated with an eligibility to win a progressive award further provides that the total amount wagered per progressive award won is equal for any wager amount above the wager amount associated with an eligibility to win a progressive award, thus enabling gaming establishment operator configurable maximum wager amounts for progressive award eligible games.

Specifically, in various embodiments, the gaming system disclosed herein enables a player to place one of a plurality of wager amounts wherein at least one wager amount is not associated with any eligibility to win a progressive award, at least one wager amount is associated with an eligibility to win the progressive award and at least one wager amount is associated with an eligibility to win the progressive award and a progressive award second chance opportunity. For example, the gaming system enables a player to place one of: (i) a minimum primary game wager of $0.10 which is not associated with any eligibility to win a progressive award. (ii) a primary game wager of $0.25 which is associated with an eligibility to win the progressive award but is not associated with any progressive award second chance opportunity. (iii) a primary game wager of $0.50 which is associated with an eligibility to win the progressive award and a progressive award second chance opportunity, and (iv) a maximum primary game wager of $1.00 which is associated with an eligibility to win the progressive award and a progressive award second chance opportunity.

In various embodiments, following the placement of the wager amount, if the placed wager amount is associated with an eligibility to win the progressive award, regardless of if the wager amount is also associated with a progressive award second chance opportunity, the gaming system provides the player a first opportunity to win the progressive award in association with a first game sequence, such as displaying a play of a primary game wherein a designated symbol combination is associated with winning the progressive award. In these embodiments, if the placed wager amount is not associated with an eligibility to win the progressive award, the gaming system provides the player the first game sequence without any associated opportunity to win the progressive award, such as displaying a play of a primary game wherein the designated symbol combination is not associated with winning the progressive award.

In these embodiments, if the player does not win the progressive award in association with the first game sequence and the placed wager amount is either not associated with an eligibility to win the progressive award or is associated with an eligibility to win the progressive award but is not associated with any progressive award second chance opportunity, the gaming system does not provide the player any second chance or opportunity to win the same progressive award. Continuing with the above example, if the player placed the minimum primary game wager of $0.10 (which is not associated with any eligibility to win a progressive award) or if the player placed the primary game wager of $0.25 (which is associated with an eligibility to win the progressive award but is not associated with any progressive award second chance opportunity) and did not win the progressive award, the gaming system does not provide the player any second chance or opportunity to win the same progressive award.

On the other hand, if the player does not win the progressive award in association with the first game sequence and the placed wager amount is associated with an eligibility to win the progressive award and a progressive award second chance opportunity, the gaming system determines whether to provide the player a second chance or opportunity to win the same progressive award in a second game sequence. For example, if the player placed the primary game wagers of either $0.50 or $1.00 (which are each associated with an eligibility to win the progressive award and a progressive award second chance opportunity), but did not win the progressive award (e.g., did not obtain the designated symbol combination during the play of the primary game), the gaming system determines whether or not to provide the player a second chance to win the same progressive award. In certain embodiments, this determination of whether to avail the player to a second opportunity to win the same progressive award is based, at least in part, on one or more events and/or determinations, associated with the first game sequence. Continuing with the above example, if the player placed the primary game wagers of either $0.50 or $1.00 and obtained a near-miss symbol combination (e.g., a symbol combination with one symbol different than the designated symbol combination) during the displayed play of the primary game, the gaming system determines to provide the player a second chance or opportunity to win the same progressive award in a second game sequence.

If the gaming system determines to provide the player a second chance or opportunity to win the same progressive award in a second game sequence, the gaming system randomly determines, in association with a second game sequence, whether to provide the progressive award to the player. Such a determination results in either the gaming system providing the progressive award to the player or the gaming system concluding the second game sequence and awaiting another wager on another first game sequence. In certain embodiments, the odds or probability of the random determination resulting in providing the progressive award to the player are dynamically scaled based on the wager amount placed. That is, the greater the progressive award eligible wager amount associated with a progressive award second chance opportunity placed, the greater the odds or probability of winning the progressive award in association with the second game sequence. For example, a player placing the maximum primary game wager of $1.00 (which is associated with an eligibility to win the progressive award and a progressive award second chance opportunity) has a greater probability of winning the progressive award during the second game sequence than a player placing a primary game wager of $0.50 (which is also associated with an eligibility to win the progressive award and a progressive award second chance opportunity).

It should be appreciated that by dynamically scaling the odds of the player winning the progressive award based on the amount of the placed wager relative to an amount of a maximum wager, for certain embodiments, the gaming system disclosed herein represents a restructuring of existing gaming systems to enable a gaming establishment operator to select or otherwise configure the maximum wager amount. That is, since the odds of the player winning the progressive award are based, at least in part, on the amount of the player's placed wager relative to a maximum available wager amount, the gaming system includes a gaming establishment configurable maximum wager amount that does not affect or otherwise modify the probabilities of obtaining certain symbols and/or the probabilities of other game events from occurring. Put differently, by automatically dynamically scaling the odds of a player winning a progressive award for different wager amounts above the wager amount associated with an eligibility to win a progressive award, the gaming system disclosed herein overcomes certain issues long faced by gaming establishment operators by providing that the total amount wagered per progressive award won is equal for any wager amount above the wager amount associated with an eligibility to win a progressive award. Such a configuration thus enables gaming establishment operator configurable maximum wager amounts for progressive award eligible games.

Accordingly, the gaming system disclosed herein provides an increased level of excitement and enjoyment to players by providing such players one or more additional chances of winning a progressive award (after unsuccessfully obtaining the progressive award) without having to retrigger the progressive award opportunity sequence. Such a configuration of employing zero, one or more second chance progressive award features in conjunction with dynamically scaling the odds of the player winning the progressive award based on the amount of placed wager relative to an amount of a maximum wager satisfies known gaming establishment operator needs pertaining to configuring maximum wager amounts within the confines of known gaming establishment operator constraints.

Additional features and advantages are described herein, and will be apparent from the following Detailed Description and the figures.

DETAILED DESCRIPTION

Progressive Award Opportunity Sequences

In various embodiments, upon placing a wager which exceeds a first threshold amount, the gaming system disclosed herein provides the player a first opportunity to win a progressive award in association with a first game sequence. If the player does not win the progressive award in association with the first game sequence, if the player's wager exceeds a second, greater threshold amount, the gaming system provides the player an additional chance or opportunity to win the same progressive award in a second game sequence. Such an additional chance may be based on one or more events which occurred either in or in association with the first game sequence. In these embodiments, based on an amount of a wager placed, the gaming system provides the player one or more opportunities to win a progressive award wherein the greater the qualifying wager amount placed, the greater the odds of winning the progressive award. In addition to combating jackpot fatigue by providing players additional chances to win a progressive award, such a improvement to or reconfiguration of existing gaming systems dynamically scales the odds of a player winning a progressive award without changing or otherwise modifying the probabilities of obtaining certain symbols and/or the probabilities of other game events from occurring. This improvement to or reconfiguration of known gaming systems by automatically dynamically scaling the odds of a player winning a progressive award for different wager amounts above the wager amount associated with an eligibility to win a progressive award further provides that the total amount wagered per progressive award won is equal for any wager amount above the wager amount associated with an eligibility to win a progressive award, thus enabling gaming establishment operator configurable maximum wager amounts for progressive award eligible games.

It should be appreciated that while the player's credit balance, the player's wager, and any awards are displayed as an amount of monetary credits or currency in the embodiments described below, one or more of such player's credit balance, such player's wager, and any awards provided to such player may be for non-monetary credits, promotional credits, and/or player tracking points or credits. It should be further appreciated that while certain of the embodiments described herein are directed to providing a second chance or opportunity to provide a progressive award following a play of a primary game, the present disclosure may additionally or alternatively be employed in association with providing a second chance or opportunity to provide a progressive award following a play of a secondary game.

Figure 1:
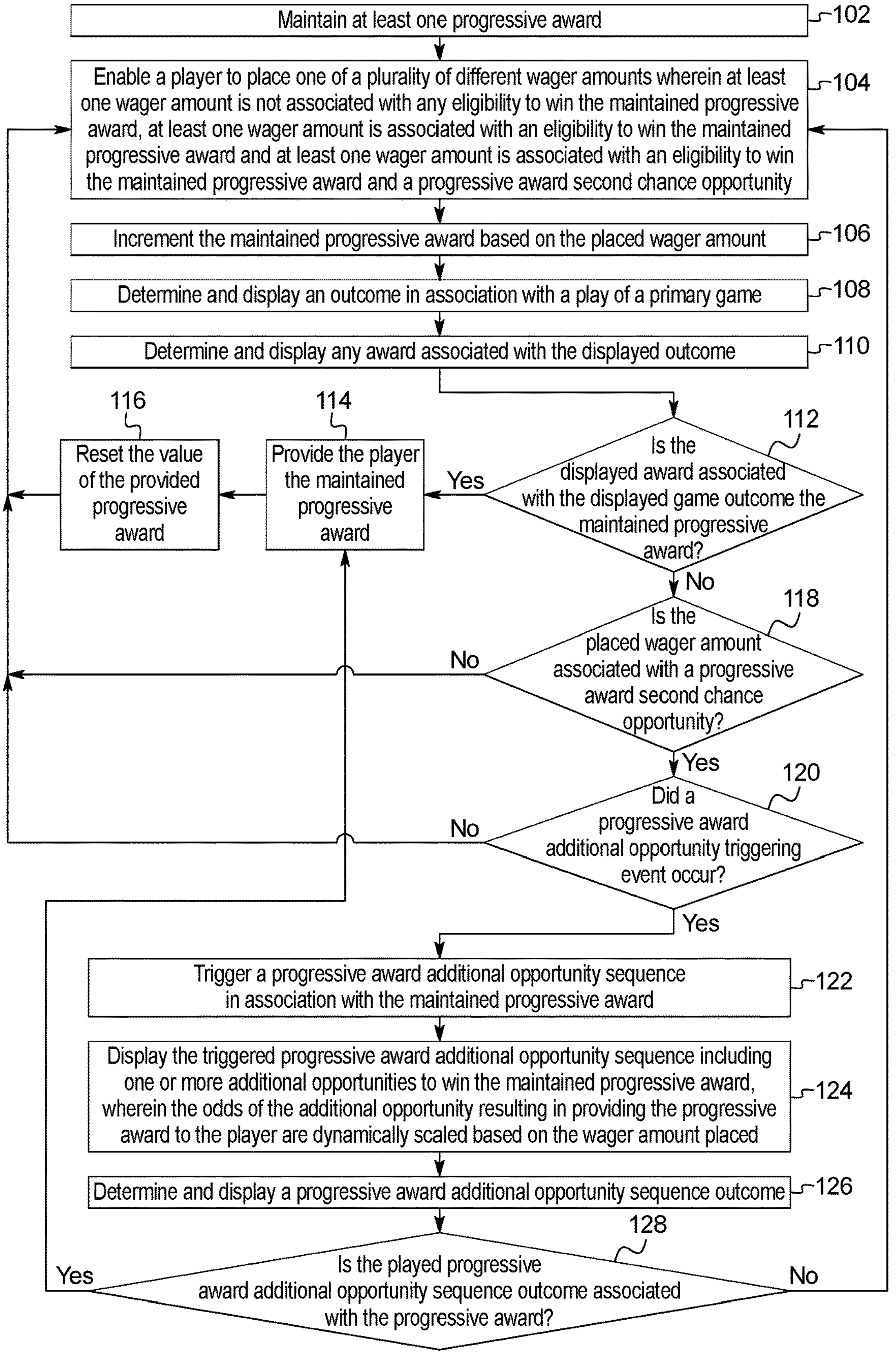
FIG. 1 a flow chart an example process for operating a gaming system including a primary game and a progressive award additional opportunity sequence as disclosed herein.

FIG. 1 is a flowchart of an example process or method of operating the gaming system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, the gaming system maintains at least one progressive award as indicated in block 102 of FIG. 1. In one embodiment, a plurality of electronic gaming machines ("EGMs") at one or more gaming sites are networked to the central server in a progressive configuration with the at least one maintained progressive award. In one such embodiment, the progressive award is a local area progressive award associated with one or more EGMs in the same gaming establishment. In another such embodiment, the progressive award is a wide area progressive associated with a plurality of EGMs at a plurality of different gaming establishments. In another embodiment, a single or standalone EGM is associated with or otherwise dedicated to the at least one maintained progressive award. In another embodiment, one or more internet accessible dedicated gaming sites are associated with the at least one maintained progressive award.

In addition to maintaining at least one progressive award, as indicated in block 104, the gaming system enables a player to place one of a plurality of different wager amounts wherein at least one wager amount is not associated with any eligibility to win the maintained progressive award, at least one wager amount is associated with an eligibility to win the maintained progressive award and at least one wager amount is associated with an eligibility to win the maintained progressive award and a progressive award second chance opportunity. That is, certain wager amounts are associated with no chance of winning the maintained progressive award, certain wager amounts are associated with one chance of winning the maintained progressive award and certain wager amounts are associated with multiple chances of winning the maintained progressive award.

Figure 2:
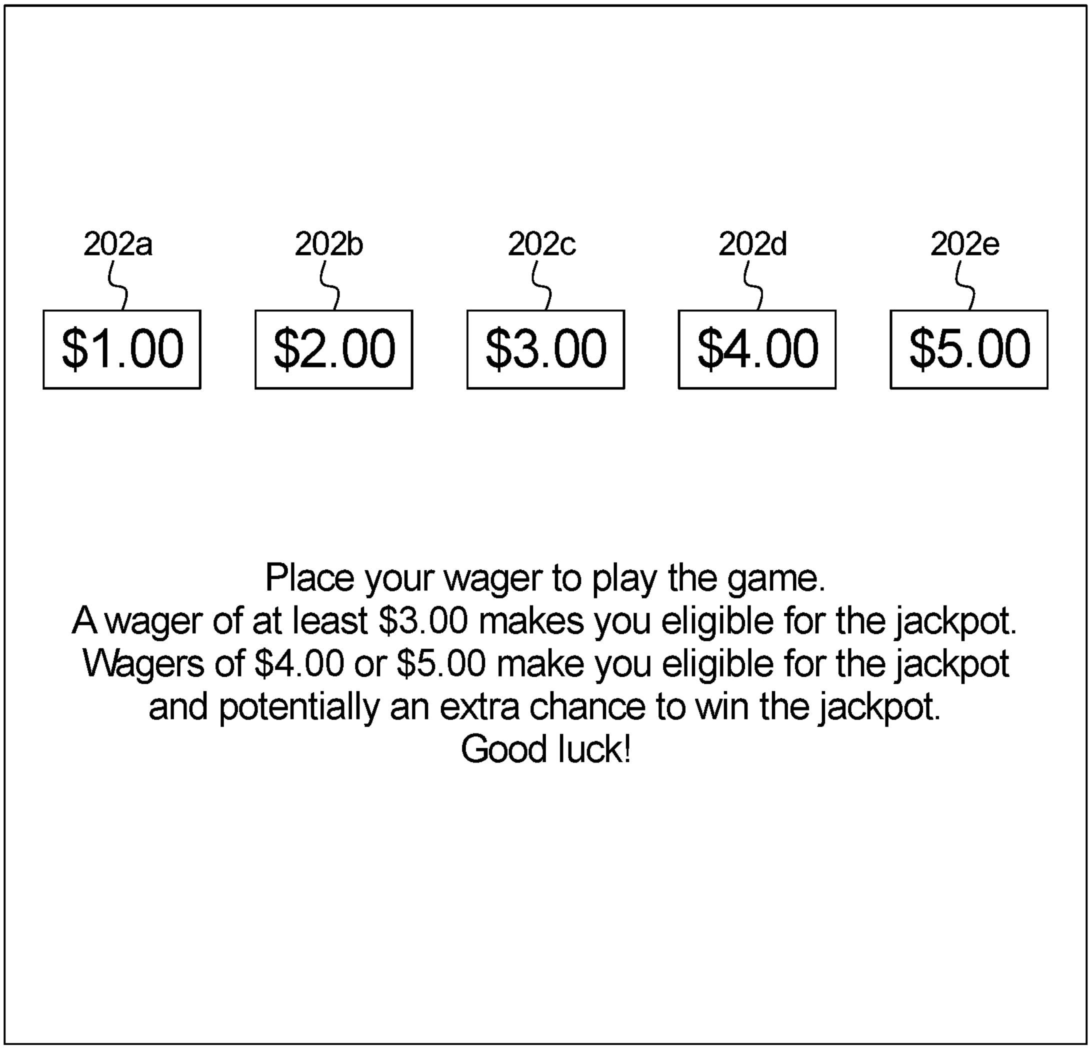
FIG. 2 is a front view of one embodiment of the gaming system disclosed herein illustrating the different wager amounts available wherein certain wager amounts are associated with a progressive award and certain wager amounts are associated with the progressive award and a progressive award additional opportunity sequence.

For example, as seen in FIG. 2, the gaming system enables a player to place one of: (i) a minimum primary game wager of $1.00 202*a* which is not associated with any eligibility to win a progressive award, (ii) a primary game wager of $2.00 202*b* which is not associated with any eligibility to win a progressive award, (iii) a primary game wager of $3.00 202*c* which is associated with an eligibility to win the progressive award but is not associated with any progressive award second chance opportunity, (iv) a primary game wager of $4.00 202*d* which is associated with an eligibility to win the progressive award and a progressive award second chance opportunity, and (v) a maximum primary game wager of $5.00 202*e* which is associated with an eligibility to win the progressive award and a progressive award second chance opportunity. In this example, the gaming system provides appropriate messages such as "PLACE YOUR WAGER TO PLAY THE GAME" "A WAGER OF AT LEAST $3.00 MAKES YOU ELIGIBLE FOR THE JACKPOT AND WAGERS OF $4.00 OR $5.00 MAKE YOU ELIGIBLE FOR THE JACKPOT AND POTENTIALLY AN EXTRA CHANCE TO WIN THE JACKPOT" and "GOOD LUCK" to the player visually, or through suitable audio or audiovisual displays.

Following the placement of a wager amount, the gaming system increments or grows the maintained progressive award based on the placed wager amount as indicated in block 106. In certain embodiments, a portion of each placed wager amount increments the maintained progressive award. In certain embodiments, a portion of designated placed wager amounts, such as wager amounts associated with an eligibility to win the maintained progressive award, increment the maintained progressive award. In different embodiments, upon each occurrence of a progressive award contribution event (e.g., a placement of a wager, a generation of a designated outcome and/or a gaming establishment marketing event) associated with the progressive award, the gaming system increments or grows that progressive award.

In addition to maintaining and incrementing the maintained progressive award based on the wager amount placed, the gaming system determines and displays an outcome in association with a play of a primary game as indicated in block 108. The gaming system then determines and displays any award associated with the displayed outcome as indicated in block 110.

It should be appreciated that had the player placed either a wager amount associated with an eligibility to win the maintained progressive award or a wager amount associated with an eligibility to win the maintained progressive award and a progressive award second chance opportunity, the play of the primary game represents a first opportunity to win the progressive award in association with a first game sequence. On the other hand, had the player placed a wager amount not associated with any eligibility to win the maintained progressive award, the play of the primary game does not represent any opportunity to win the progressive award. That is, the amount of the placed wager is either associated with an eligibility to win the maintained progressive award or is associated with an ineligibility to win the maintained progressive award. Continuing with the example of FIG. 2, the paytable employed in association with a placed wager amount of $3, $4 or $5 includes a progressive award associated with a designated symbol combination, while the paytable employed in association with a placed wager amount of $1 or $2 includes no progressive award associated with the designated symbol combination.

Following the display of any award associated with the displayed game outcome, the gaming system determines if the displayed award associated with the displayed game outcome is the maintained progressive award as indicated in diamond 112 of FIG. 1.

If the displayed award associated with the displayed game outcome is the maintained progressive award, the gaming system provides the player the maintained progressive award and resets the value of the provided progressive award as indicated in blocks 114 and 116. The gaming system then returns to block 104 and again enables the player to place one of the plurality of different wager amounts.

In certain embodiments, the determination of whether or not to provide the player the progressive award occurs at an individual EGM. That is, an EGM in the progressive award system randomly determines, according to an associated probability, whether or not to provide the progressive award to the player. Upon the EGM determining a progressive award outcome, the EGM communicates the results of such a determination to one or more progressive awards servers to validate the progressive award win and authorize the progressive award amount to be provided by (or otherwise in association with) the EGM. In these embodiments, the one or more progressive award servers proceed to reset the amount of the progressive award and broadcast the reset amount of the progressive award to each of the EGMs which are part of the progressive award system. In these embodiments, following the reset of the progressive award and the update of the progressive award amount to the participating EGMs, the one or more progressive award servers resume incrementing the new reset amount based on wager amounts placed.

On the other hand, if the displayed award associated with the displayed game outcome is not the maintained progressive award, the gaming system determines if the placed wager amount is associated with a progressive award second chance opportunity as indicated in diamond 118.

If the placed wager amount is not associated with any progressive award second chance opportunity, the gaming system returns to block 104 and again enables the player to place one of the plurality of different wager amounts. That is, if the player does not win the progressive award in association with the primary game played and the placed wager amount is either not associated with an eligibility to win the progressive award or is associated with an eligibility to win the progressive award but is not associated with any progressive award second chance opportunity, the gaming system does not provide the player any second chance or opportunity to win the same progressive award. Continuing with the example of FIG. 2, if the player placed the primary game wagers of $1.00 or $2.00 (which are each not associated with any eligibility to win a progressive award) or if the player placed the primary game wager of $3.00 (which is associated with an eligibility to win the progressive award but is not associated with any progressive award second chance opportunity) and did not win the progressive award (i.e., the displayed award associated with the displayed game outcome is not the maintained progressive award), the gaming system does not provide the player any second chance or opportunity to win the same progressive award.

On the other hand, if the placed wager amount is associated with a progressive award second chance opportunity, the gaming system determines if a progressive award additional opportunity triggering event occurred as indicated in diamond 120 of FIG. 1. That is, if the player does not win the progressive award in association with the play of the primary game and the placed wager amount is associated with each of an eligibility to win the progressive award and a progressive award second chance opportunity, the gaming system determines whether to provide the player a second chance or opportunity to win the same progressive award in a second game sequence. Continuing with the example of FIG. 2, if the player placed the primary game wagers of $4.00 or $5.00 (which are each associated with an eligibility to win the progressive award and a progressive award second chance opportunity), but did not win the progressive award (i.e., the displayed award associated with the displayed game outcome is not the maintained progressive award), the gaming system determines whether or not to provide the player a second chance to win the same progressive award. In an alternative embodiment, if the player does not win the progressive award in association with the play of the primary game and the placed wager amount is not associated with each of an eligibility to win the progressive award and a progressive award second chance opportunity, the gaming system determines whether to provide the player a second chance or opportunity to win the same progressive award in a second game sequence and displays such a determination to the player. Such a display creates an increased level of excitement and suspense for certain players by demonstrating to them what may have happened if they had placed a qualifying wager amount.

In one embodiment, a progressive award additional opportunity triggering event occurs based on a displayed event in the play of the primary game. In one such embodiment, the displayed event includes the player obtaining a near miss outcome which includes an outcome that is similar to a designated outcome, but differs slightly in at least one respect, such as an outcome which misses a royal straight flush (associated with the maintained progressive award) in a poker game by one card or an outcome which misses the designated symbol combination associated with the maintained progressive award by one symbol. In this embodiment, such an opportunity functions to lessen the effect on the player which may occur following the player nearly missing the maintained progressive award.

In another embodiment, the gaming system tracks the occurrences of one or more suitable events occurring at or in association with one or more players and/or one or more games and determines, based on these tracked events, whether a progressive award additional opportunity triggering event occurs. In another embodiment, the gaming system defines one or more game play parameters, wherein each time a player's tracked game play activity satisfies the defined parameter, a progressive award additional opportunity triggering event occurs. In another embodiment, a progressive award additional opportunity triggering event occurs independent of any displayed event in any play of any game.

If the gaming system determined that no progressive award additional opportunity triggering event occurred, the gaming system returns to block 104 of FIG. 1 and again enables the player to place one of the plurality of different wager amounts.

On the other hand, if the gaming system determined that a progressive award additional opportunity triggering event occurred, as indicated in block 122, the gaming system triggers a progressive award additional opportunity sequence in association with the maintained progressive award.

Following the triggering of the progressive award additional opportunity sequence, the gaming system proceeds to display the triggered progressive award additional opportunity sequence including one or more additional opportunities to win the maintained progressive award, wherein the odds or probability of the additional opportunity resulting in providing the progressive award to the player are dynamically scaled based on the wager amount placed as indicated in block 124. As such, in response to an occurrence of a triggering event, the gaming system employs an additional game phase including one or more chances to win the same progressive award, wherein the amount of the player's wager at least partially determine the player's probability of winning the progressive award in the additional game phase. Accordingly, even if the player is unsuccessful in winning the progressive award in the play of the primary game, the gaming system may, based on the occurrence of a triggering event, proceed to a second game for additional prospects of winning the same progressive award.

In one embodiment, the greater the progressive award eligible wager amount associated with a progressive award second chance opportunity placed, the greater the odds or probability of winning the progressive award in association with the second game sequence. Continuing with the example of FIG. 2, the primary game wager of $4.00 (which is associated with an eligibility to win the progressive award and a progressive award second chance opportunity) is associated with a lower probability of winning the progressive award during a triggered progressive award additional opportunity sequence than the probability of winning the progressive award during a triggered progressive award additional opportunity sequence associated with the primary game wager of $5.00 (which is also associated with an eligibility to win the progressive award and a progressive award second chance opportunity).

In one example embodiment, the gaming system is configured such that the probability of the maintained progressive award occurring is determined by P(E1)*P(E2) wherein:

$$P(E1)=P(X1)*P(X2)* \ldots *P(Xm):$$

$$P(E2)=P(Xm+1)*P(Xm+2)* \ldots *P(Xn):$$

E1 includes Events 1 of X1 and X2 . . . and Xm;

E2 includes Events 2 of Xm+1 and Xm+2 . . . and Xn, and all Xi occur independently of each other.

In this example embodiment, whenever event E1 happens, but E2 does not, and the player is betting any wager amount greater than the minimum wager amount to be eligible to win the progressive award, a secondary event (i.e., a progressive award additional opportunity sequence) is triggered. For the triggered secondary event, the determination of whether or not the progressive award is provided is based on a probability determined by (B−BO)/(BO*(1/P(E2)−1), wherein BO is the minimum wager amount to be eligible to win the progressive award and B is any wager amount greater than BO.

Continuing with the example of FIG. 2, the progressive award is available for any wager amount of $3.00 or greater and the designated symbol combination associated with winning the progressive award includes the symbols 3M, 4M, and 5M on the payline, wherein the probabilities of such symbols independently occurring are P(3M)=(1/500), P(4M)=(1/489), and P(5M)=(1/400). In this example, if we take E1=3M and 4M, and E2=5M, suppose the player is wagering $5 and gets 3M on Reel 1, 4M on Reel 2, but no 5M on Reel 3 (i.e., the player has obtained a near miss outcome and a progressive award additional opportunity triggering event occurs). As opposed to a $3 wager amount wherein, as explained above, no progressive award second chance opportunity exists, the $5.00 wager amount is associated with a progressive award second chance opportunity. In this example, the probability of the player winning the progressive award during the progressive award additional opportunity sequence is P(secondary win)=(5−3)/(3*(400−1)). As such, in this example, the total probability of the player winning the progressive award for a $5.00 wager amount placed is (1/500)*(1/489)*(1/400)+(1/500)*(1/489)*(399/400)*(5−3)/(3*(400−1)).

It should be appreciated that this example illustrates that the total amount wagered per progressive award won is equal for any wager amount above the wager amount associated with an eligibility to win a progressive award. Specifically, the reciprocal of the above-described total probability of the player winning the progressive award for a $5.00 wager amount placed multiplied by the $5.00 wager amount is $293,400,00 which is the same dollars per progressive award earned at the $3 wager amount which is not associated with any progressive award additional opportunity sequence. That is, the gaming system of the present disclosure provides the dollars per progressive award scale linearly with the wager amount. As such, this example provides that the dollars per progressive award would be equal for any wager amount level above the minimum progressive award eligible wager amount thus enabling configurable maximum wager amount progressive award games.

It should be appreciated further that, as described above, by dynamically scaling the odds of the player winning the progressive award based on the amount of the placed wager relative to an amount of a maximum wager, the gaming system disclosed herein enables a gaming establishment operator to select or otherwise configure the maximum wager amount. That is, since the odds of the player winning the progressive award are based, at least in part, on the amount of the player's placed wager relative to a maximum available wager amount, the gaming system includes a gaming establishment configurable maximum wager amount that does not affect or otherwise modify the probabilities of obtaining certain symbols and/or the probabilities of other game events from occurring.

Returning to FIG. 1, for the triggered progressive award additional opportunity sequence, the gaming system determines and displays a progressive award additional opportunity sequence outcome as indicated in block 126. The gaming system then determines, as indicated in diamond 128, whether to provide the player the progressive award associated with the occurrence of the triggered progressive award additional opportunity sequence, wherein this determination is based on the displayed progressive award additional opportunity sequence outcome.

If the gaming system determines to provide the player the progressive award associated with the occurrence of the triggered progressive award additional opportunity sequence, the gaming system provides the player the maintained progressive award and resets the value of the provided progressive award as indicated in blocks 114 and 116. The gaming system then returns to block 104 and again enables the player to place one of the plurality of different wager amounts.

On the other hand, if the gaming system determines not to provide the player the progressive award associated with the occurrence of the triggered progressive award additional opportunity sequence, the gaming system returns to block 104 of FIG. 1 and again enables the player to place one of the plurality of different wager amounts.

In certain embodiments, as described above, the gaming system enables a player to place one of a plurality of wager amounts wherein at least one wager amount is not associated with any eligibility to win a progressive award, at least one wager amount is associated with an eligibility to win the progressive award and at least one wager amount is associated with an eligibility to win the progressive award and a progressive award second chance opportunity. In different embodiments, the gaming system enables a player to place one of a plurality of wager amounts wherein each wager amount is associated with an eligibility to win the progressive award and at least one wager amount is associated with an eligibility to win the progressive award and a progressive award second chance opportunity. In different embodiments, the gaming system enables a player to place one of a plurality of wager amounts wherein each wager amount is associated with an eligibility to win the progressive award and each wager amount is associated with an eligibility to win the progressive award and a progressive award second chance opportunity. In these embodiments, a player's probability of winning the progressive award via the progressive award second chance opportunity increases linearly with the wager amount level.

In one embodiment, the gaming system employs one or more secondary games to determine whether to provide the player the progressive award associated with the occurrence of the progressive award additional opportunity triggering event. In one embodiment, for a triggered progressive award additional opportunity sequence, the gaming system employs a weighted table to determine whether to provide the player the progressive award associated with the occurrence of the progressive award opportunity triggering event. In another embodiment, for a triggered progressive award additional opportunity sequence the gaming system employs a secondary game including a progressive award generator. In this embodiment, the progressive award generator spins and any progressive award symbols indicated by an indicator determine whether to provide the player the progressive award associated with the occurrence of the progressive award additional opportunity triggering event. In another embodiment, for a triggered progressive award additional opportunity sequence, the gaming system employs a secondary game including a progressive award reel. In this embodiment, the progressive award reel spins and any progressive award symbols generated along a payline determine whether to provide the player the progressive award associated with the occurrence of the progressive award additional opportunity triggering event. In another embodiment, for a triggered progressive award additional opportunity sequence the gaming system employs a secondary game including a game of skill wherein the determination of whether to provide the player the progressive award associated with the occurrence of the progressive award additional opportunity triggering event corresponds to the player's performance as compared to a baseline performance level of the skill game. It should be appreciated that any suitable secondary game may be employed in association with determining whether to provide the player the progressive award associated with thane occurrence of the progressive award additional opportunity triggering event.

In different embodiments, one or more primary games and/or one or more progressive award additional opportunity sequences include, but are not limited to:

i, a play of any suitable slot game;
ii, a play of any suitable free spins or free game activations;
iii, a play of any suitable wheel game;
iv, a play of any suitable card game;
v, a play of any suitable offer and acceptance game;
vi, a play of any suitable award ladder game;
vii, a play of any suitable puzzle-type game;
viii, a play of any suitable persistence game;
ix, a play of any suitable selection game;
x, a play of any suitable cascading symbols game;
xi, a play of any suitable ways to win game;
xii a play of any suitable scatter pay game;
xiii, a play of any suitable coin-pusher game;
xiv, a play of any suitable elimination game;
xv, a play of any suitable stacked wilds game;
xvi, a play of any suitable trail game;
xvii, a play of any suitable bingo game;
xviii, a play of any suitable video scratch-off game;
xix, a play of any suitable pick-until-complete game;
xx, a play of any suitable shooting simulation game;
xxi, a play of any suitable racing game;
xxii, a play of any suitable promotional game;
xxiii, a play of any suitable high-low game;
xxiv, a play of any suitable lottery game;
xxv, a play of any suitable number selection game;
xxvi, a play of any suitable dice game;
xxvii, a play of any suitable skill game;
xxviii, a play of any suitable auction game;
xxix, a play of any suitable reverse-auction game;
xxx, a play of any suitable group game;
xxxi, a play of any suitable game in a service window;
xxxii, a play of any suitable game on a mobile device; and/or
xxxiii, a play of any suitable game disclosed herein.

In different embodiments, the gaming system determines whether to provide the player the progressive award in association with a triggered progressive award additional opportunity sequence based on one or more modifications to the displayed outcome of the primary game. In various embodiments, one or more features employed to modify one or more aspects of the displayed outcome of the primary game include, but are not limited to:

i, a book-end wild symbols feature;
ii, a stacked wild symbols feature;
iii, an expanding wild symbols feature;
iv, a retrigger symbol feature;
v, an anti-terminator symbol feature;
vi, a locking reel feature,
vii, a locking symbol position feature;
viii, a modifier, such as a multiplier, feature;
ix, a feature modifying a number of wagered on paylines;
x, a feature modifying a wager placed on one or more paylines (or on one or more designated paylines);
xi, a feature modifying a number of ways to win wagered on;
xii, a feature modifying a wager placed on one or more ways to win (or on one or more designated ways to win);
xiii, a feature modifying a paytable utilized for a play of a game;
xiv, a feature modifying an average expected payback percentage of a play of a game;
xv, a feature modifying an average expected payout of a play of a game;
xvi, a feature modifying one or more awards available;
xvii, a feature modifying a range of awards available;
xviii, a feature modifying a type of awards available;
xix, a feature modifying one or more modifiers, such as multipliers, available;
xx, a feature modifying an activation of a reel (or a designated reel);
xxi, a feature modifying an activation of a plurality of reels;
xxii, a feature modifying a generated outcome (or a designated generated outcome);
xxiii, a feature modifying a generated outcome (or a designated generated outcome) associated with an award over a designated value;
xxiv, a feature modifying a generated outcome (or a designated generated outcome) on a designated payline;
xxv, a feature modifying a generated outcome (or a designated generated outcome) in a scatter configuration;
xxvi, a feature modifying a winning way to win (or a designated winning way to win);
xxvii, a feature modifying a designated symbol or symbol combination;

xxviii, a feature modifying a generation of a designated symbol or symbol combination on a designated payline;

xxix, a feature modifying a generation of a designated symbol or symbol combination in a scatter configuration;

xxx, a feature modifying a quantity of picks in a selection game;

xxxi, a feature modifying a quantity of offers in an offer and acceptance game;

xxxii, a feature modifying a quantity of moves in a trail game;

xxxiii, a feature modifying an amount of free spins provided;

xxxiv, a feature modifying a game terminating or ending condition;

xxxv, a feature modifying a player's avatar; and/or xxxvi, a feature modifying any game play feature associated with any play of any game disclosed herein.

In certain embodiments, as described above, the determination of whether to provide the player the progressive award is based on an outcome of the play of the primary game and any outcome of any progressive award additional opportunity sequence. In certain embodiments, the determination of whether to provide the player the progressive award is based on an outcome of a play of a secondary game and any outcome of any progressive award additional opportunity sequence. In these embodiments, as described above, the probability of the player winning the progressive award is dynamically scaled based on the amount of the wager placed.

In different embodiments, one or more awards provided in association with one or more primary game plays, one or more secondary game plays, one or more progressive award additional opportunity sequences include one or more of: a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free dinner, a free night's stay at a hotel, a high value product such as a free car, or a low value product one or more bonus credits usable for online play, a lump sum of player tracking points or credits, a multiplier for player tracking points or credits, an increase in a membership or player tracking level, one or more coupons or promotions usable within and/or outside of the gaming establishment (e.g., a 20% off coupon for use at a convenience store), virtual goods associated with the gaming system, virtual goods not associated with the gaming system, an access code usable to unlock content on an internet.

In one embodiment, the gaming system causes at least one display device of at least one EGM to display any sequences associated with winning a progressive award. In another embodiment, in addition or in alternative to each EGM displaying any sequences associated with winning a progressive award, the gaming system causes one or more community or overhead display devices to display part or all of any sequences associated with winning a progressive award to one or more other players or bystanders either at a gaming establishment or viewing over a network, such as the internet. In another embodiment, in addition or in alternative to each EGM displaying any sequences associated with winning a progressive award, the gaming system causes one or more internet sites to each display any sequences associated with winning a progressive award such that a player is enabled to log on from a personal web browser. In another such embodiment, the gaming system enables the player to play one or more games on one device while viewing any sequences associated with winning a progressive award from another device, such as a desktop or laptop computer.

In different embodiments, a progressive award additional opportunity triggering event occurs based on an outcome associated with one or more plays of any primary games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the gaming system does not provide any apparent reasons to the players for an occurrence of a progressive award opportunity triggering event. In these embodiments, such determinations are not triggered by an event in a primary game or based specifically on any of the plays of any primary games. That is, these events occur without any explanation or alternatively with simple explanations.

In one such embodiment, a progressive award additional opportunity triggering event occurs based on an amount of coin-in. In this embodiment, the gaming system determines if an amount of coin-in reaches or exceeds a designated amount of coin-in (i.e., a threshold coin-in amount). Upon the amount of coin-in wagered reaching or exceeding the threshold coin-in amount, the gaming system causes one or more of such events or conditions to occur. In another such embodiment, a progressive award additional opportunity triggering event occurs based on an amount of virtual currency-in. In this embodiment, the gaming system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the gaming system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a progressive award additional opportunity triggering event occurs based on an amount of coin-out. In this embodiment, the gaming system determines if an amount of coin-out reaches or exceeds a designated amount of coin-out (i.e., a threshold coin-out amount). Upon the amount of coin-out reaching or exceeding the threshold coin-out amount, the gaming system causes one or more of such events or conditions to occur. In another such embodiment, a progressive award additional opportunity triggering event occurs based on an amount of virtual currency-out. In this embodiment, the gaming system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the gaming system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a progressive award additional opportunity triggering event occurs based on a predefined variable reaching a defined parameter threshold. For example, when the 500,000$^{th}$ player has played an EGM (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In different embodiments, a progressive award additional opportunity triggering event occurs based on a quantity of games played. In this embodiment, a quantity of games played is set for when one or more of such events or conditions will occur. In one embodiment, such a set quantity of games played is based on historic data.

In different embodiments, a progressive award additional opportunity triggering event occurs based on time. In this embodiment, a time is set for when one or more of such events or conditions will occur. In one embodiment, such a set time is based on historic data.

In different embodiments, a progressive award additional opportunity triggering event occurs based upon gaming system operator defined player eligibility parameters stored on a player tracking system (such as via a player tracking card or other suitable manner). In this embodiment, the parameters for eligibility are defined by the gaming system operator based on any suitable criterion. In one embodiment, the gaming system recognizes the player's identification (via the player tracking system) when the player inserts or otherwise associates their player tracking card in the EGM. The gaming system determines the player tracking level of the player and if the current player tracking level defined by the gaming system operator is eligible for one or more of such events or conditions. In one embodiment, the gaming system operator defines minimum bet levels required for such events or conditions to occur based on the player's card level.

In different embodiments, a progressive award additional opportunity triggering event occurs based on a system determination, including one or more random selections by the central controller. In one embodiment, as described above, the gaming system tracks all active EGMs and the wagers they placed. In one such embodiment, based on the EGM's state as well as one or more wager pools associated with the EGM, the gaming system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a progressive award additional opportunity triggering event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the player in that primary game. At the end of the primary game, the randomly selected number is compared with the numbers allocated to the player and if a match occurs, one or more of such events or conditions occur. It should be appreciated that any suitable manner of causing a progressive award additional opportunity triggering event to occur may be implemented in accordance with the gaming system and method disclosed herein.

It should be appreciated that one or more of the above-described triggers pertaining to a progressive award additional opportunity triggering event occurring may be combined in one or more different embodiments.

Alternative Embodiments

It should be appreciated that in different embodiments, one or more of:

i, a quantity of maintained progressive awards;

ii, one or more reset values of one or more progressive awards;

iii, one or more contribution rates of one or more progressive awards;

iv, when a progressive award additional opportunity triggering event occurs;

v, a type of progressive award additional opportunity sequence to trigger;

vi, a quantity of progressive awards to enable the player to play for in a progressive award additional opportunity sequence;

vii, which progressive award(s) to enable the player to play for in a progressive award additional opportunity sequence;

viii, a quantity of chances to enable the player to win the progressive award in a progressive award additional opportunity sequence;

ix, whether to provide a player a progressive award in association with a progressive award additional opportunity sequence; and/or x, any determination disclosed herein;

is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming system, determined independent of a random determination at the gaming system, determined based on at least one play of at least one game, determined independent of at least one play of at least one game, determined based on a player's selection, determined independent of a player's selection, determined based on one or more side wagers placed, determined independent of one or more side wagers placed, determined based on the player's primary game wager, determined independent of the player's primary game wager, determined based on time (such as the time of day), determined independent of time (such as the time of day), determined based on an amount of coin-in accumulated in one or more pools, determined independent of an amount of coin-in accumulated in one or more pools, determined based on a status of the player (i.e., a player tracking status), determined independent of a status of the player (i.e., a player tracking status), determined based on one or more other determinations disclosed herein, determined independent of any other determination disclosed herein or determined based on any other suitable method or criteria.

Gaming Systems

The above-described embodiments of the present disclosure may be implemented in accordance with or in conjunction with one or more of a variety of different types of gaming systems, such as, but not limited to, those described below:

The present disclosure contemplates a variety of different gaming systems each having one or more of a plurality of different features, attributes, or characteristics. A "gaming system" as used herein refers to various configurations of: (a) one or more central servers, central controllers, or remote hosts: (b) one or more EGMs such as those located on a casino floor: and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more EGMs in combination with one or more central servers, central controllers, or remote hosts: (b) one or more personal gaming devices in combination with one or more central servers, central controllers, or remote hosts: (c) one or more personal gaming devices in combination with one or more EGMs: (d) one or more personal gaming devices, one or more EGMs, and one or more central servers, central controllers, or remote hosts in combination with one another: (e) a single EGM: (f) a plurality of EGMs in combination with one another: (g) a single personal gaming device: (h) a plurality of personal gaming devices in combination with one another: (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal computing device" as used herein represents one personal computing device or a plurality of personal computing devices, and "central server, central controller, or remote host" as used herein represents one central server, central controller, or remote host or a plurality of central servers, central controllers, or remote hosts.

Figure 3:
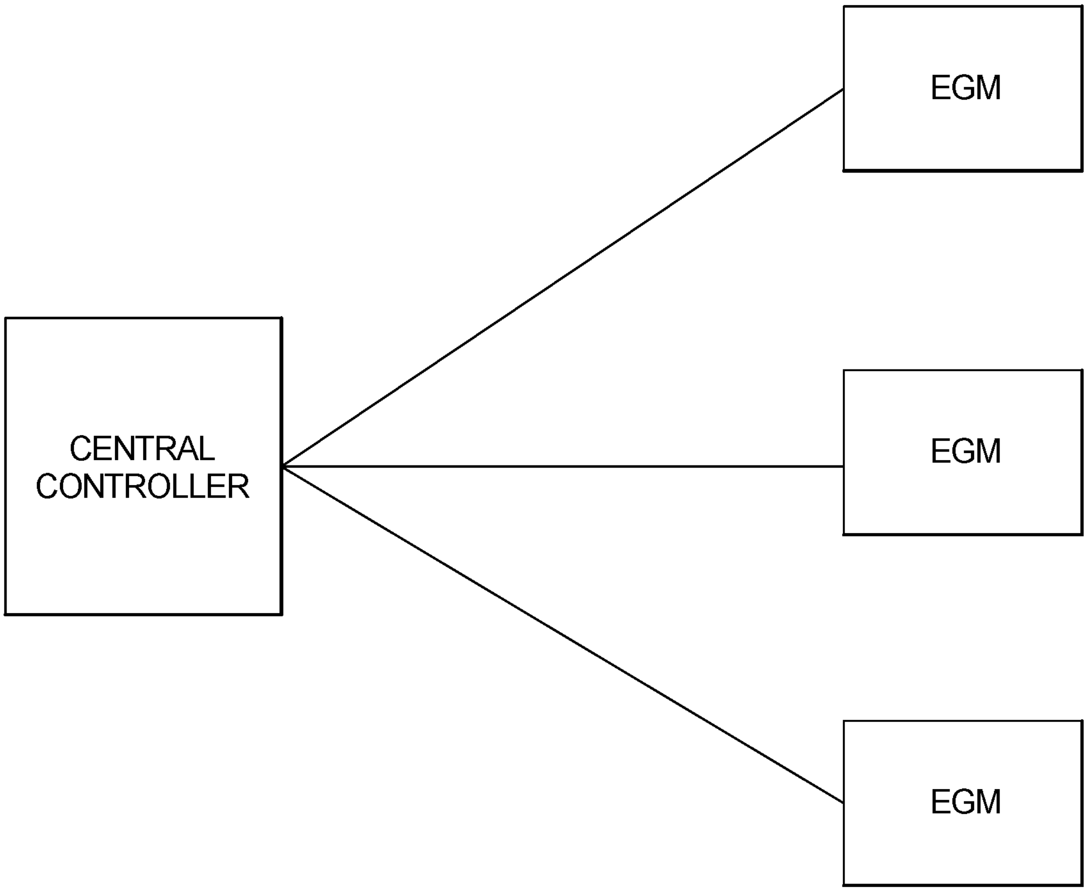
FIG. 3 is a schematic block diagram of one embodiment of a network configuration of the gaming system disclosed herein.

As noted above, in various embodiments, the gaming system includes an EGM (or personal computing device) in combination with a central server, central controller, or remote host. In such embodiments, the EGM (or personal computing device) is configured to communicate with the central server, central controller, or remote host through a data network or remote communication link. In certain such embodiments, the EGM (or personal computing device) is configured to communicate with another EGM (or personal computing device) through the same data network or remote communication link or through a different data network or remote communication link. For example, the gaming system illustrated in FIG. 3 includes a plurality of EGMs that are each configured to communicate with a central server, central controller, or remote host through a data network.

In certain embodiments in which the gaming system includes an EGM (or personal computing device) in combination with a central server, central controller, or remote host, the central server, central controller, or remote host is any suitable computing device (such as a server) that includes at least one processor and at least one memory device or data storage device. As further described herein, the EGM (or personal computing device) includes at least one EGM (or personal computing device) processor configured to transmit and receive data or signals representing events, messages, commands, or any other suitable information between the EGM (or personal computing device) and the central server, central controller, or remote host. The at least one processor of that EGM (or personal computing device) is configured to execute the events, messages, or commands represented by such data or signals in conjunction with the operation of the EGM (or personal computing device). Moreover, the at least one processor of the central server, central controller, or remote host is configured to transmit and receive data or signals representing events, messages, commands, or any other suitable information between the central server, central controller, or remote host and the EGM (or personal computing device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal computing device). Further, one, more than one, or each of the functions of the at least one processor of the EGM (or personal computing device) may be performed by the at least one processor of the central server, central controller, or remote host.

In certain such embodiments, computerized instructions for controlling any games (such as any primary or base games and/or any secondary or bonus games) displayed by the EGM (or personal computing device) are executed by the central server, central controller, or remote host. In such "thin client" embodiments, the central server, central controller, or remote host remotely controls any games (or other suitable interfaces) displayed by the EGM (or personal computing device), and the EGM (or personal computing device) is utilized to display such games (or suitable interfaces) and to receive one or more inputs or commands. In other such embodiments, computerized instructions for controlling any games displayed by the EGM (or personal computing device) are communicated from the central server, central controller, or remote host to the EGM (or personal computing device) and are stored in at least one memory device of the EGM (or personal computing device). In such "thick client" embodiments, the at least one processor of the EGM (or personal computing device) executes the computerized instructions to control any games (or other suitable interfaces) displayed by the EGM (or personal computing device).

In various embodiments in which the gaming system includes a plurality of EGMs (or personal computing devices), one or more of the EGMs (or personal computing devices) are thin client EGMs (or personal computing devices) and one or more of the EGMs (or personal computing devices) are thick client EGMs (or personal computing devices). In other embodiments in which the gaming system includes one or more EGMs (or personal computing devices), certain functions of one or more of the EGMs (or personal computing devices) are implemented in a thin client environment, and certain other functions of one or more of the EGMs (or personal computing devices) are implemented in a thick client environment. In one such embodiment in which the gaming system includes an EGM (or personal computing device) and a central server, central controller, or remote host, computerized instructions for controlling any primary or base games displayed by the EGM (or personal computing device) are communicated from the central server, central controller, or remote host to the EGM (or personal computing device) in a thick client configuration, and computerized instructions for controlling any secondary or bonus games or other functions displayed by the EGM (or personal computing device) are executed by the central server, central controller, or remote host in a thin client configuration.

In certain embodiments in which the gaming system includes: (a) an EGM (or personal computing device) configured to communicate with a central server, central controller, or remote host through a data network: and/or (b) a plurality of EGMs (or personal computing devices) configured to communicate with one another through a data network, the data network is a local area network (LAN) in which the EGMs (or personal computing devices) are located substantially proximate to one another and/or the central server, central controller, or remote host. In one example, the EGMs (or personal computing devices) and the central server, central controller, or remote host are located in a gaming establishment or a portion of a gaming establishment.

In other embodiments in which the gaming system includes: (a) an EGM (or personal computing device) configured to communicate with a central server, central controller, or remote host through a data network: and/or (b) a plurality of EGMs (or personal computing devices) configured to communicate with one another through a data network, the data network is a wide area network (WAN) in which one or more of the EGMs (or personal computing devices) are not necessarily located substantially proximate to another one of the EGMs (or personal computing devices) and/or the central server, central controller, or remote host. For example, one or more of the EGMs (or personal computing devices) are located: (a) in an area of a gaming establishment different from an area of the gaming establishment in which the central server, central controller, or remote host is located: or (b) in a gaming establishment different from the gaming establishment in which the central server, central controller, or remote host is located. In another example, the central server, central controller, or remote host is not located within a gaming establishment in which the EGMs (or personal computing devices) are located. In certain embodiments in which the data network is a WAN, the gaming system includes a central server, central controller, or remote host and an EGM (or personal computing device) each located in a different gaming establishment in a same geographic area, such as a same city or a same state. Gaming systems in which the data network is a WAN are substantially identical to gaming systems in which the data network is a LAN, though the quantity of EGMs (or personal computing devices) in such gaming systems may vary relative to one another.

In further embodiments in which the gaming system includes: (a) an EGM (or personal computing device) configured to communicate with a central server, central controller, or remote host through a data network: and/or (b) a plurality of EGMs (or personal computing devices) configured to communicate with one another through a data network, the data network is an internet (such as the Internet) or an intranet. In certain such embodiments, an Internet browser of the EGM (or personal computing device) is usable to access an Internet game page from any location where an Internet connection is available. In one such embodiment, after the EGM (or personal computing device) accesses the Internet game page, the central server, central controller, or remote host identifies a player prior to enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player: by reading a player tracking card or other smart card inserted into a card reader (as described below): by validating a unique player identification number associated with the player by the central server, central controller, or remote host: or by identifying the EGM (or personal computing device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal computing device). Examples of implementations of Internet-based gaming are further described in U.S. Pat. No. 8,764,566, entitled “Internet Remote Game Server,” and U.S. Pat. No. 8,147,334, entitled “Universal Game Server,” which are incorporated herein by reference.

The central server, central controller, or remote host and the EGM (or personal computing device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal computing devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
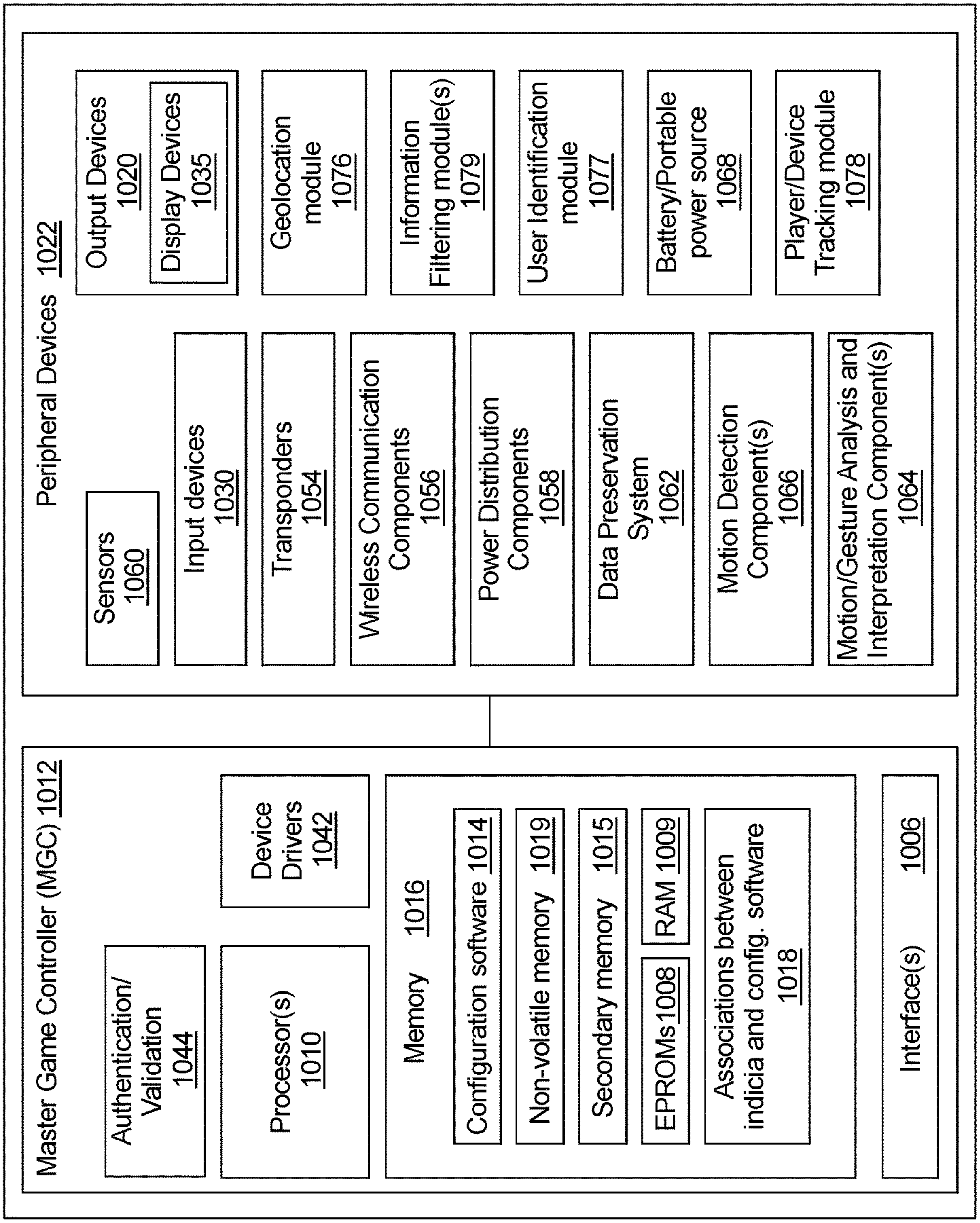
FIG. 4 is a schematic block diagram of one embodiment of an electronic configuration of an example gaming system disclosed herein.
Figure 5A:
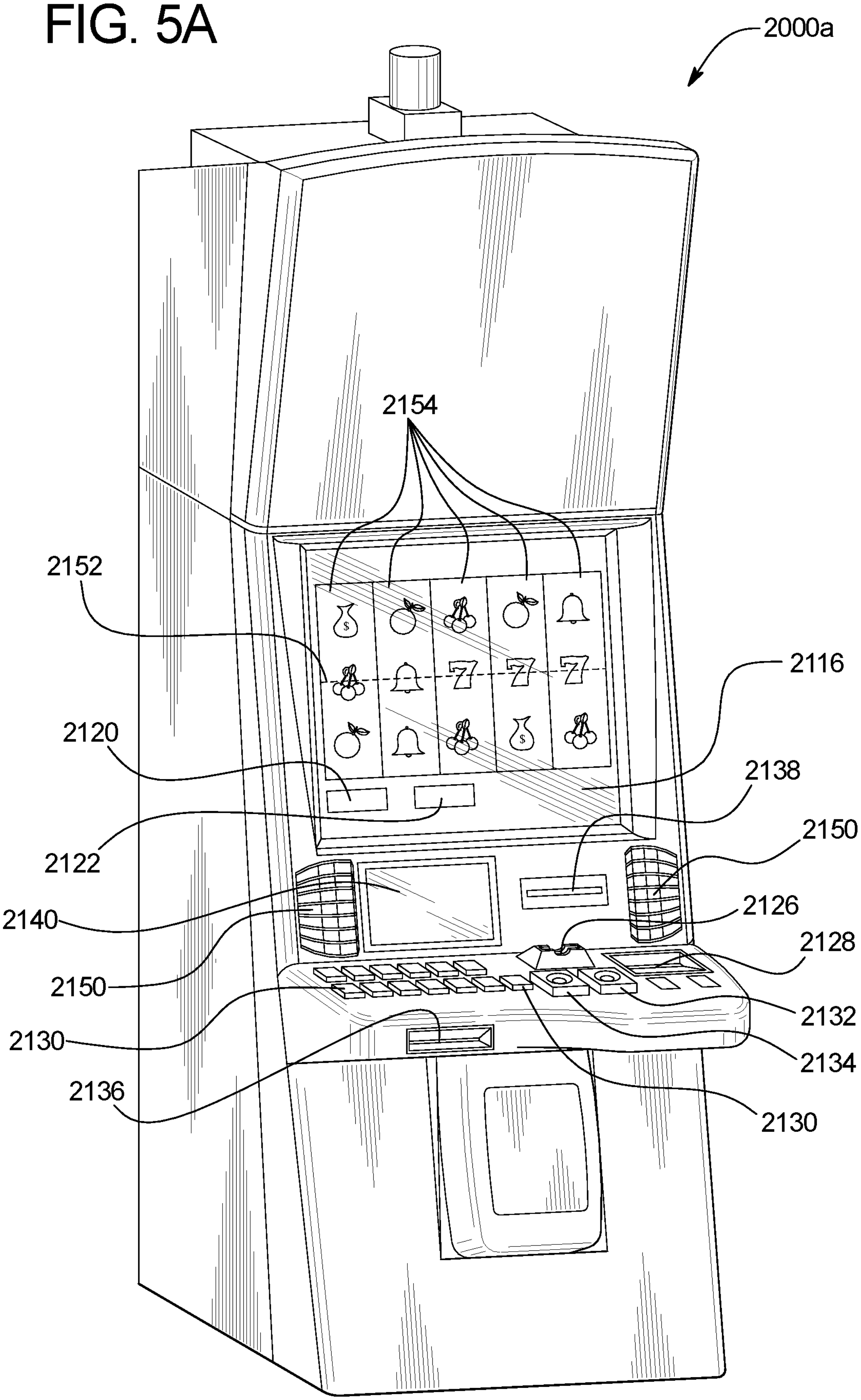
FIGS. 5A and 5B are perspective views of example alternative embodiments of the gaming system disclosed herein.
Figure 5B:
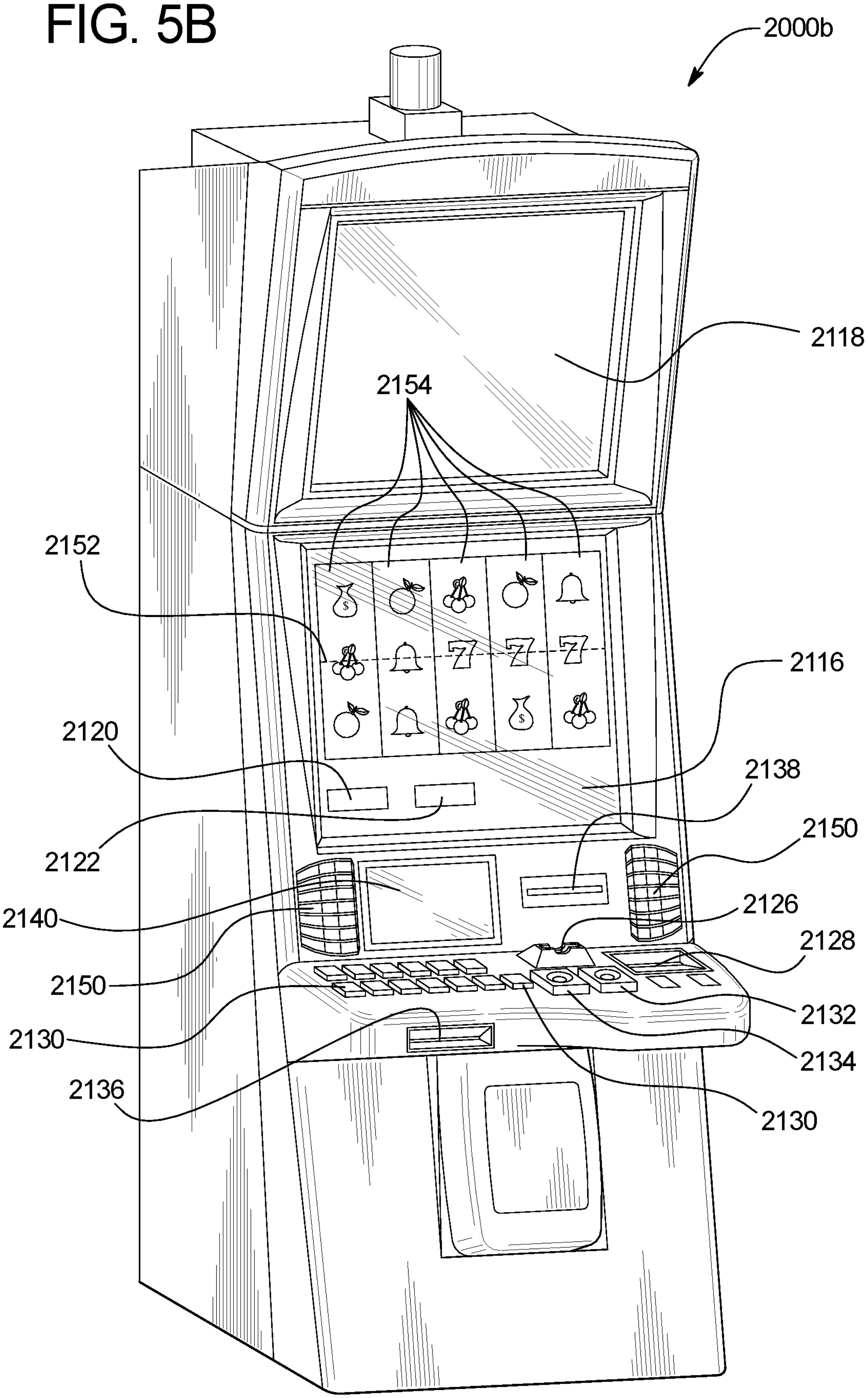

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012: (2) converting signals read by an interface to a format corresponding to that used by software or memory of the EGM; (3) accessing memory to configure or reconfigure game parameters in the memory according to indicia read from the EGM: (4) communicating with interfaces and the peripheral devices 1022 (such as input/output devices): and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms): (2) non-volatile memory 1019 (e.g., disk memory; FLASH memory; EPROMS, EEPROMs, memristor-based non-volatile solid-state memory; etc.); (3) unalterable memory (e.g., EPROMs 1008): (4) read-only memory: and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM: (2) associations 1018 between configuration indicia read from an EGM with one or more parameters and settings: (3) communication protocols configured to enable the at least one processor 1010 to communicate with the peripheral devices 1022: and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets," which is incorporated herein by reference.

In certain embodiments, the peripheral devices 1022 include several device interfaces, such as: (1) at least one output device 1020 including at least one display device 1035: (2) at least one input device 1030 (which may include contact and/or non-contact interfaces): (3) at least one transponder 1054: (4) at least one wireless communication component 1056: (5) at least one wired/wireless power distribution component 1058: (6) at least one sensor 1060: (7) at least one data preservation component 1062: (8) at least one motion/gesture analysis and interpretation component 1064: (9) at least one motion detection component 1066: (10) at least one portable power source 1068: (11) at least one geolocation module 1076: (12) at least one user identification module 1077: (13) at least one player/device tracking module 1078: and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device: (b) a player tracking display configured to display various information regarding a player's player tracking status (as described below): (c) a secondary or upper display device in addition to the central display device and the player tracking display: (d) a credit display configured to display a current quantity of credits, amount of cash, account balance, or the equivalent: and (e) a bet display configured to display an amount wagered for one or more plays of one or more games. The example EGM **2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122**.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects: dynamic lighting: video images: images of people, characters, places, things, and faces of cards: and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system: (b) a bill dispenser configured to dispense paper currency; (c) a coin dispenser configured to dispense coins or tokens (such as into a coin payout tray); and (d) any suitable combination thereof. The example EGMs **2000*a* and 2000*b* illustrated in FIGS. 5A and 5B each include a ticket printer and dispenser 2136**. Examples of ticket-in ticket-out (TITO) technology are described in U.S. Pat. No. 5,429,361, entitled "Gaming Machine Information, Communication and Display System": U.S. Pat. No. 5,470,079, entitled "Gaming Machine Accounting and Monitoring System": U.S. Pat. No. 5,265,874, entitled "Cashless Gaming Apparatus and Method": U.S. Pat. No. 6,729,957, entitled "Gaming Method and Host Computer with Ticket-In/Ticket-Out Capability": U.S. Pat. No. 6,729,958, entitled "Gaming System with Ticket-In/Ticket-Out Capability": U.S. Pat. No. 6,736,725, entitled "Gaming Method and Host Computer with Ticket-In/Ticket-Out Capability": U.S. Pat. No. 7,275,991, entitled "Slot Machine with Ticket-In/Ticket-Out Capability"; U.S. Pat. No. 6,048,269, entitled "Coinless Slot Machine System and Method": and U.S. Pat. No. 5,290,003, entitled "Gaming Machine and Coupons." which are incorporated herein by reference.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player: via a transfer of funds onto an electronically recordable identification card or smart card of the player: or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine," which is incorporated herein by reference.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM: (b) a ticket acceptor into which a ticket or a voucher is inserted to fund the EGM: (c) a coin slot into which coins or tokens are inserted to fund the EGM: (d) a reader or a validator for credit cards, debit cards, or credit slips into which a credit card, debit card, or credit slip is inserted to fund the EGM: (e) a player identification card reader into which a player identification card is inserted to fund the EGM: or (f) any suitable combination thereof. The example EGMs 2000*a* and 2000*b* illustrates in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine." which is incorporated herein by reference. When the EGM is funded, the at least one processor determines the amount of funds entered and displays the corresponding amount on a credit display or any other suitable display as described below:

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally: upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below; the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi): 802.15 (including Bluetooth™): 802.16 (WiMax): 802.22: cellular standards such as CDMA, CDMA2000, and WCDMA: Radio Frequency (e.g., RFID): infrared: and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM: detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player: interpret the player's motion or gestures (e.g., in the context of a casino game being played) to identify instructions or input from the player: utilize the interpreted instructions/input to advance the game state: etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions displayed by the EGM are provided with the EGM prior to delivery to a gaming establishment or prior to being provided to a player: and (b) a changeable EGM in which computerized game programs executable by the EGM for controlling any primary games and/or secondary games displayed by the EGM are downloadable or otherwise transferred to the EGM through a data network or remote communication link: from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM): (b) writing the executable game program onto a disc or other media: or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability; and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set: that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus": U.S. Pat. No. 7,563,163, entitled "Gaming Device Including Outcome Pools for Providing Game Outcomes": U.S. Pat. No. 7,833,092, entitled "Method and System for Compensating for Player Choice in a Game of Chance": U.S. Pat. No. 8,070,579, entitled "Bingo System with Downloadable Common Patterns": and 8,398,472, entitled "Central Determination Poker Game," which are incorporated herein by reference.

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options": U.S. Pat. No. 7,731,581, entitled "Multi-Player Bingo Game with Multiple Alternative Outcome Displays": U.S. Pat. No. 7,955,170, entitled "Providing Non-Bingo Outcomes for a Bingo Game": U.S. Pat. No. 8,070,579, entitled "Bingo System with Downloadable Common Patterns": and U.S. Pat. No. 8,500,538, entitled "Bingo Gaming System and Method for Providing Multiple Outcomes from Single Bingo Pattern." which are incorporated herein by reference.

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles. (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System." and U.S. Pat. No. 8,597,116, entitled "Virtual Player Tracking and Related Services." which are incorporated herein by reference.

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games: video card games such as video draw poker, multi-hand video draw poker, other video poker games, video blackjack games, and video baccarat games: video keno games: video bingo games: and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM **2000*b* shown in FIG. 5B includes a payline 1152 and a plurality of reels 1154**. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning": U.S. Pat. No. 8,241,104, entitled "Gaming Device and Method Having Designated Rules for Determining Ways To Win": and U.S. Pat. No. 8,430,739, entitled "Gaming System and Method Having Wager Dependent Different Symbol Evaluations." which are incorporated herein by reference.

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout": U.S. Pat. No. 7,666,093, entitled "Gaming Method and Device Involving Progressive Wagers": U.S. Pat. No. 7,780,523, entitled "Server Based Gaming System Having Multiple Progressive Awards": and U.S. Pat. No. 8,337,298, entitled "Gaming Device Having Multiple Different Types of Progressive Awards." which are incorporated herein by reference As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased: rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled "Server Based Gaming System and Method for Selectively Providing One or More Different Tournaments": U.S. Pat. No. 8,500,548, entitled "Gaming System and Method for Providing Team Progressive Awards": and U.S. Pat. No. 8,562,423, entitled "Method and Apparatus for Rewarding Multiple Game Players for a Single Win." which are incorporated herein by reference.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming system to begin a gaming session, the card reader reads the player identification number off the player tracking card to identify the player. The gaming system timely tracks any suitable information or data relating to the identified player's gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled "Universal Player Tracking System": U.S. Pat. No. 6,908,387, entitled "Player Tracking Communication Mechanisms in a Gaming Machine": U.S. Pat. No. 7,311,605, entitled "Player Tracking Assembly for Complete Patron Tracking for Both Gaming and Non-Gaming Casino Activity": U.S. Pat. No. 7,611,411, entitled "Player Tracking Instruments Having Multiple Communication Modes": U.S. Pat. No. 7,617,151, entitled "Alternative Player Tracking Techniques": and U.S. Pat. No. 8,057,298, entitled "Virtual Player Tracking and Related Services," which are incorporated herein by reference.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases. EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below:

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs. (2) the harsh environment in which EGMs operate. (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below: A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled "Authentication in a Secure Computerized Gaming System"; U.S. Pat. No. 7,043,641, entitled "Encryption in a Secure Computerized Gaming System": U.S. Pat. No. 7,201, 662, entitled "Method and Apparatus for Software Authentication": and U.S. Pat. No. 8,627,097, entitled "System and Method Enabling Parallel Processing of Hash Functions Using Authentication Checkpoint Hashes." which are incorporated herein by reference.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry: These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just prior to the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability: data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just prior to when the malfunction occurred. The restored state may include metering information and graphical information that was displayed on the EGM in the state prior to the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just prior to the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM prior to, during, and/or after the disputed game to demonstrate whether the player was correct or not in her assertion. Examples of a state-based EGM, recovery from malfunctions, and game history are described in U.S. Pat. No. 6,804,763, entitled "High Performance Battery Backed RAM Interface": U.S. Pat. No. 6,863,608, entitled "Frame Capture of Actual Game Play"; U.S. Pat. No. 7,111,141, entitled "Dynamic NV-RAM": and U.S. Pat. No. 7,384,339, entitled. "Frame Capture of Actual Game Play." which are incorporated herein by reference.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification," which is incorporated herein by reference.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment," which is incorporated herein by reference.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System," which is incorporated herein by reference.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A gaming system comprising:

a processor; and a memory device that stores a plurality of instructions that, when executed by the processor, cause the processor to:

cause a display, by a display device, of a plurality of different wager amounts available to be placed on a play of a game, wherein:

a first of the wager amounts that exceeds a first threshold amount is associated with an eligibility to be provided a progressive award, and a first probability of being provided the progressive award from the play of the game, a second of the wager amounts that is greater than the first of the wager amounts is associated with the eligibility to be provided the same progressive award, and a second, greater probability of being provided the same progressive award from one of the play of the game and an event separate from the play of the game, and each of the plurality of different wagers amounts are associated with a first paytable comprising a first plurality of symbol combinations and a first plurality of respective probabilities associated with such first plurality of symbol combinations, responsive to the first of the wager amounts being placed on the play of the game and following an occurrence in association with the play of the game that is based on the first probability, cause a display, by the display device, of a winning of the progressive award, and responsive to the second of the wager amounts being placed on the play of the game and following an occurrence in association with the play of the game or the event separate from the play of the game that is based on the second probability, cause a display, by the display device, of the winning of progressive award.

2. The gaming system of claim 1, wherein the second of the wager amounts exceeds a second threshold amount.

3. The gaming system of claim 1, wherein a third of the wager amounts is not associated with any eligibility of being provided the progressive award, the third of the wager amounts being less than the first threshold amount.

4. The gaming system of claim 1, wherein the first probability of being provided the progressive award is based on the first of the wager amounts relative to a maximum wager amount.

5. The gaming system of claim 4, wherein the maximum wager amount comprises a gaming establishment operator configurable maximum wager amount.

6. A method of operating a gaming system, the method comprising:

displaying, by a display device, a plurality of different wager amounts available to be placed on a play of a game, wherein:

a first of the wager amounts that exceeds a first threshold amount is associated with an eligibility to be provided a progressive award, and a first probability of being provided the progressive award from the play of the game, a second of the wager amounts that is greater than the first of the wager amounts is associated with the eligibility to be provided the same progressive award, and a second, greater probability of being provided the same progressive award from one of the play of the game and an event separate from the play of the game, and each of the plurality of different wagers amounts are associated with a first paytable comprising a first plurality of symbol combinations and a first plurality of respective probabilities associated with such first plurality of symbol combinations, responsive to the first of the wager amounts being placed on the play of the game and following an occurrence in association with the play of the game that is based on the first probability, displaying, by a display device, a winning of the progressive award, and responsive to the second of the wager amounts being placed on the play of the game and following an occurrence in association with the play of the game or the event separate from the play of the game that is based on the second probability, displaying, by the display device, a winning of the progressive award.

7. The method of claim 6, wherein the second of the wager amounts exceeds a second threshold amount.

8. The method of claim 6, wherein a third of the wager amounts is not associated with any eligibility of being provided the progressive award, the third of the wager amounts being less than the first threshold amount.

9. The method of claim 8, wherein the first probability of being provided the progressive award is based on the first of the wager amounts relative to a maximum wager amount.

10. The method of claim 9, wherein the maximum wager amount comprises a gaming establishment operator configurable maximum wager amount.

* * * * *